(No Model.) 2 Sheets—Sheet 1.
A. E. G. LUBKE.
DYNAMO ELECTRIC MACHINE.
No. 296,857. Patented Apr. 15, 1884.
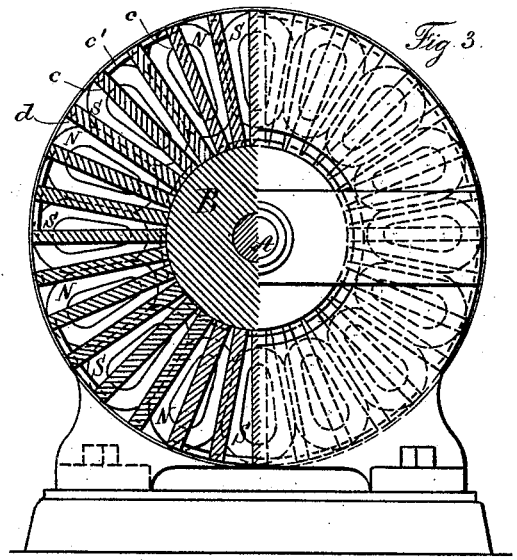
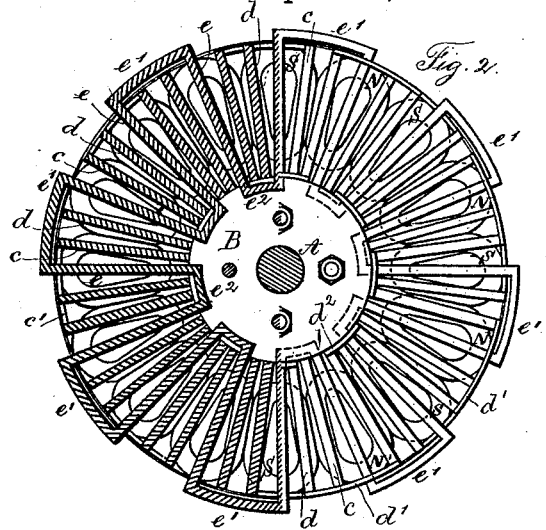
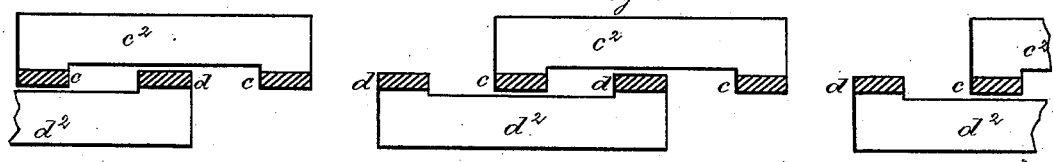
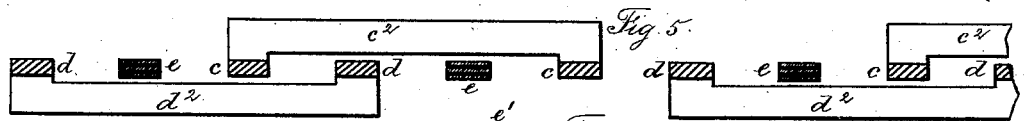
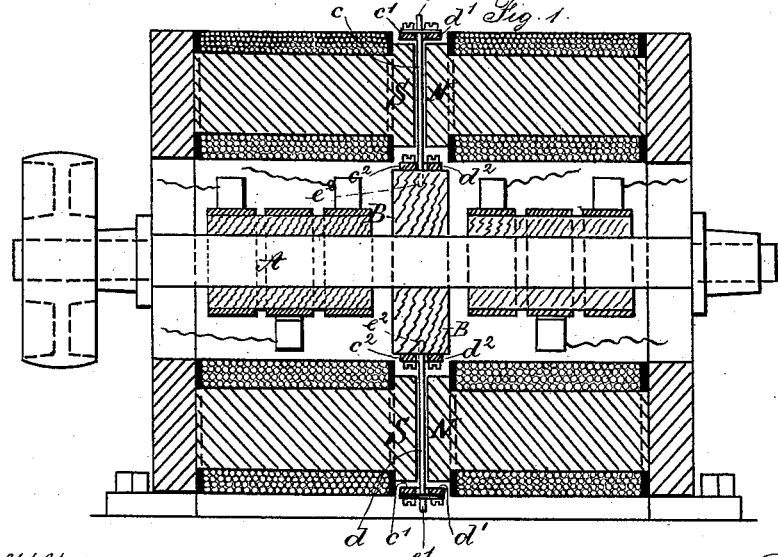
Witnesses
J. Staib
Chas H Smith
Inventor
A. E. G. Lubke
per Lemuel W. Serrell
atty (No Model.)  A. E. G. LUBKE.  2 Sheets—Sheet 2.
DYNAMO ELECTRIC MACHINE.

No. 296,857.  Patented Apr. 15, 1884.

Witnesses
Chas. H. Smith
Harold Serrell

Inventor
A. E. G. Lubke
for Lemuel W. Serrell
atty.

UNITED STATES PATENT OFFICE.

ADOLPH E. GUSTAV LUBKE, OF NEW YORK, N. Y.

DYNAMO-ELECTRIC MACHINE.

SPECIFICATION forming part of Letters Patent No. 296,857, dated April 15, 1884.

Application filed March 13, 1884. (No model.)

*To all whom it may concern:*

Be it known that I, ADOLPH E. GUSTAV LUBKE, of the city and State of New York, have invented an Improvement in Dynamo-Electric Machines, of which the following is a specification.

Before my invention the armatures of dynamo or magneto electric machines had been made with radial wires united into loops at the outer and inner ends, respectively, and these radial wires or bars had been revolved before the faces of the field-magnets, or between the poles of two circular ranges of field-magnets. In addition to this, the radial wires or bars have been connected up with commutator bars or plates, and two or more ranges of loops have been placed side by side; but, as these have to be insulated from each other, the thickness of the armature-wheel has been increased and the distance between the poles of the magnets has been augmented, and hence the electric energy set up by the magnetism has been lessened.

My invention has for its object the connecting up of two or more ranges of loops in the armature-wheel in such a manner that all the radial bars are in the same plane; hence the field-magnets can be placed in as close proximity to the revolving armature-wheel as possible, and the greatest electrical effect obtained from the magnetism of said field-magnets.

Figure 6:
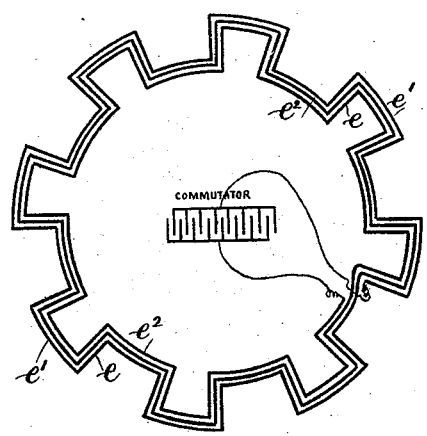
Figure 7:
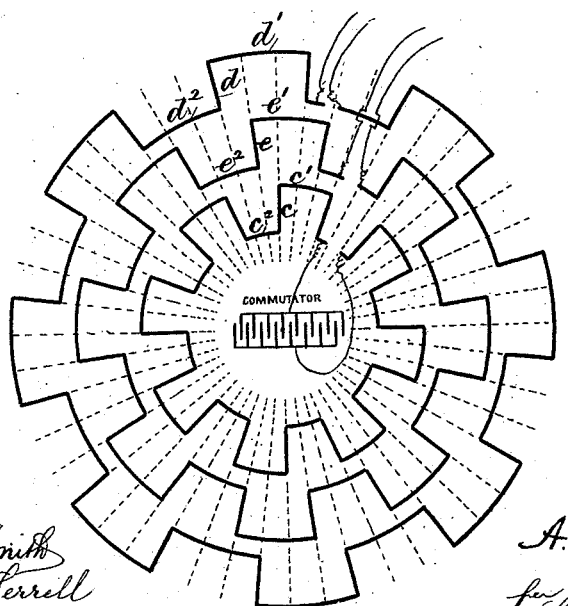

In the drawings, Figure 1 is a vertical section longitudinally of the shaft. Fig. 2 is an elevation and partial sectional view of the armature-loops. Fig. 3 is a view similar to Fig. 2 as adapted to two ranges of loops. Fig. 4 is a diagram of the relative positions of the rim of the armature-wheels and bars, with two sets of loops. Fig. 5 is a similar view with three sets of loops. Fig. 6 represents the circuit-connections where there are three armature-plates in one range connected up into one circuit and to the commutator-plates. Fig. 7 represents the three separate ranges of loops connected up for a set of commutator-bars for each range of loops.

The field-magnets N S are preferably arranged in two circular rows, with the poles facing each other and with the poles alternating. The construction of these is of an ordinary character and does not require to be further described.

The shaft A is revolved by competent power, and it has a hub, B, to which the inner ends of the radial bars $c$ $d$ $e$ are fastened. These bars stand in the same plane, and are as close together as consistent with proper insulation. These bars may be connected up into two or three separate armature-helices. If they are connected up in two ranges, there is to be a lateral projection, $c'$, extending out over the pole of the field-magnet S, and uniting the bars $c$ $c$ at their outer ends, and a similar lateral projection, $c^2$, at the hub uniting the alternate inner ends. So, likewise, the bars $d$ are united at their alternate outer ends by the lateral projection $d'$ over the pole-faces of the field-magnets N and similar lateral projections, $d^2$, at the inner ends of the alternate bars $d$, so that each set forms a complete ring of radial bars connected at outer and inner ends alternately, and each ring is free from contact with the other; but the bars $c$ $d$ are all in one plane. So, likewise, if there is a third range, the bars $e$ are connected in pairs outside the bars $c'$ $d'$ by an arch-piece, $e'$, and at the alternate inner ends by a similar arch-piece, $e^2$. These are in the same plane as the bars $c$, $d$, and $e$, but outside and inside their respective ends and the connecting-bars $c'$ $d'$ and $c^2$ $d^2$, and hence free from contact. This improvement allows for the use of as many bars as possible, and at the same time the radial bars that are the same distance apart as the axes of the field-magnets are united, so that the currents are set up in the ranges of armature-helix bars as they pass the respective poles. In some instances I prefer to make the bars $e$ $e'$ $e^2$ of layers of thin metal plates, with layers of insulating material between them, so as to allow for several separate connections to commutators and external circuits to be made, these connections being taken off from the inner parts, $e^2$, to the commutator-bars in the usual manner. If a current of intensity is desired, the separate plates composing the bars $e$ $e'$ $e^2$ may be connected up in one circuit by separating one of the bars $e^2$ in each plate and uniting it to the next end of the next plate, and so on throughout the layers, and then taking off the connections to the commutator-plates from one of the armature-plates. These connections to the armature-plates, being well known, do not require further description. They are, however, represented in Fig. 6.

The radial bars $c\ d$ and their connections $c'$ $c^2\ d'\ d^2$ may be made of layers of insulated plates similar to the plates $e\ e'\ e^2$, if desired, and they may be connected up with the armature-plates in the same manner.

In the drawings I have only represented three sets of radial bars connected up into three circuits; but it will be evident that a larger number of such sets of radial bars all in the same plane may be made use of in the armature-wheel.

1. I claim as my invention—

1. The combination, with the circular ranges of field-magnets, of a revolving armature composed of radial bars, all in the same plane, and connected up in two or more circuit-rings by means of lateral connections that pass alternately from the outer and the inner ends of such radial bars, substantially as set forth.

2. The combination, in a circular armature-wheel, of radial bars, all in one plane, and alternate lateral connections from the respective bars, to compose two or more separate armature-helices, substantially as set forth.

3. In a circular armature-wheel, radial bars composed of thin plates set together flatwise, with insulating material between, and connected up into a circuit by the alternate connections at the ends, substantially as set forth.

4. In an armature-wheel, the radial bars in two ranges, connected together at their outer ends and at the alternate inner ends of the respective ranges, substantially as specified.

Signed by me this 7th day of March, A. D. 1884.

ADOLPH E. GUSTAV LUBKE.

Witnesses:
GEO. T. PINCKNEY,
WILLIAM G. MOTT.